C. A. SCHROYER.
CAR COUPLING.
APPLICATION FILED AUG. 8, 1907.

926,295.

Patented June 29, 1909.

Witnesses:

Inventor:
Charles A. Schroyer,
By Sheridan & Wilkinson
Attys.

UNITED STATES PATENT OFFICE.

CHARLES A. SCHROYER, OF OAK PARK, ILLINOIS.

CAR-COUPLING.

No. 926,295.　　　Specification of Letters Patent.　　　Patented June 29, 1909.

Application filed August 8, 1907. Serial No. 387,681.

*To all whom it may concern:*

Be it known that I, CHARLES A. SCHROYER, a citizen of the United States, residing at Oak Park, in the county of Cook and State of Illinois, have invented certain new and useful Improvements in Car-Couplers, of which the following is a specification.

My invention relates to improvements in car couplers, and the object is to provide an improved car coupling and uncoupling device.

It is also my object to make a device of this class which when mounted on a freight car shall permit coupling of a passenger car without any disadvantage.

Further objects and advantages will be apparent from the following specification and claims.

Figure 1:
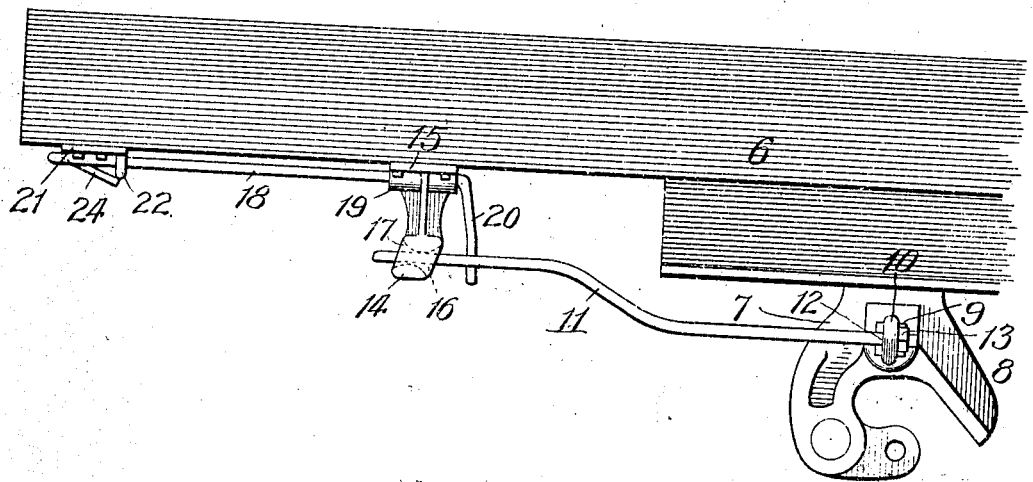
Figure 2:
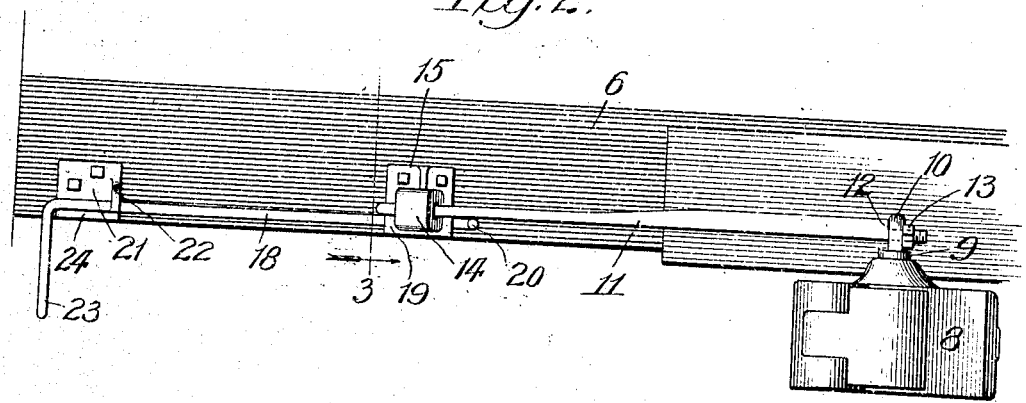
Figure 3:
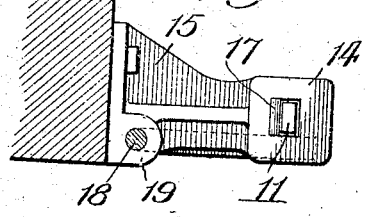
Figure 4:
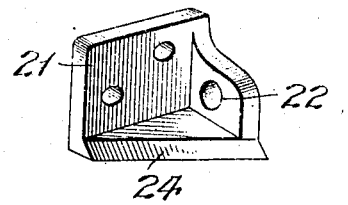

In the accompanying drawings—Figure 1 is a plan view. Fig. 2 is an elevation of my uncoupling device. Fig. 3 is a detail view of a section on the line 3 of Fig. 2, looking in the direction of the arrow. Fig. 4 is a perspective view of a detail.

Projecting from the end of the car 6, in the usual manner, is a draw-bar 7 which terminates in the coupling member 8. These parts and the locking pin 9 form no part of my present invention and are therefore not shown in detail. The locking pin 9 is surmounted by an eye 10 and a horizontal rod 11 projects through the eye 10 being definitely held therein by the shoulder 12 and the opposite nut 13. The said rod 11 at its other end extends through a sleeve 14, which is supported by a bracket 15 from the end of the car 6. The inner edges of the sleeve 14 are beveled at 16 and 17, as shown in dotted lines in Fig. 1, so as to permit the draw-bar end of the rod 11 to swing forward horizontally.

A shaft 18 is mounted in a bearing 19 in the bracket 15 and has its end 20 bent horizontally so as to extend under the rod 11. The shaft 18 is given further support by a bracket 21 carrying the bearing 22, and its end 23 is bent vertically down, as shown in Fig. 2, to form an operating handle. Alongside this handle the bracket 21 has a beveled oblique guiding surface 24.

The drawings show the device with the parts in the positions which they would occupy if the coupling 8 were holding the corresponding member of another car. If the operator desires to uncouple the car he turns the handle 23 away from the car and up, thus causing the crank 20 to lift the rod 11, and with it the locking pin 9. This releases the knuckle of the coupling member, in a manner well-known to those familiar with this art. If the operator wishes the locking pin 9 to be held up he pushes on the handle 23, so as to displace the shaft 18 longitudinally, and the oblique guide 24 holds the handle 23 in a position corresponding to the raised position of the locking pin 9.

If now the car illustrated is to be coupled to another car the impact will push the draw-bar 7 in toward the car 6. At this time the crank 20 will extend at an incline up and away from the bearing 19 and the displacement of the draw-bar 7, just referred to, will push the rod 11 horizontally toward the car 6 out of contact with the crank 20. The shaft 18 with its crank 20 and handle 23 will then be freed from any binding action, and will drop back into the position shown in the drawings, thus permitting the locking-pin 9 to hold the cars coupled. Thus it will be seen that my device operates automatically. It is also to be noted that it applies equally well to couplers equipped with or without a lock-set for the locking pin 9. As is well-known, those couplers which have a lock-set are so arranged that if when the locking pin 9 is raised, it is at the same time inclined so that its upper end leans toward the car, then its lower end will catch so as to hold it up in this position. I desire to call attention to the fact that when my uncoupling device is operated in the manner described to uncouple a car, the arm 20 not only tends to raise the rod 11 but also to throw it back toward the car, thus giving the locking pin 9 the backward inclination referred to. Hence if a coupler has a lock-set, the application of my uncoupling device thereto will operate its lock-set in the desired manner.

If the draw-bar 7 should for any reason be pulled out away from the car 6, the beveling of the sleeve 14 at 16 and 17 will permit the withdrawal of the rod 11 without injury to the remaining parts. I desire to call attention to the fact that my uncoupling device is operated like those commonly in use, that is, by a down-directed crank handle at the corner of the car.

With the style of coupler commonly in use which has a crank extending from the car 6 over the locking pin 9 with a chain connecting the two, difficulty is experienced in coupling up a freight car and a passenger car. The platform of the passenger car projecting over the locking pin 9 has a tendency to cut or wear away the chain, just referred to, or to bend or jam the crank to which it is attached. It will be noted that in my device there are no parts which rise more than a few inches above the coupling member 8, and thus the platform of a passenger car coming close to the freight car would clear the parts referred to.

The rod 11 is so related to its end connections that whatever longitudinal displacement may occur, will be entirely at the end opposite the locking pin. In other words, this rod is attached to the locking pin in such a way as to prevent relative longitudinal displacement, but freedom of such movement is secured at the other end, by the sleeve connection that has been described.

I claim:

1. An uncoupling device for car couplers comprising a transverse horizontal rod attached at one end to the upper end of the locking pin, the other end of said rod having a fulcrum on the car framework, a shaft extending in substantially the same direction as the said rod past said fulcrum, one end of said shaft being bent to engage the rod and the opposite end thereof being bent to serve as a handle, and journals in which said shaft is mounted so as to permit rotation about its axis.

2. An uncoupling device for car couplers comprising a transverse horizontal rod attached at one end to the locking pin, the other end of said rod having a fulcrum on the car framework, a shaft extending past said fulcrum one end of said shaft being bent to extend under the rod and the opposite end thereof being bent to serve as a handle, said journals also permitting longitudinal displacement of the shaft therein, and a guide beside the said handle, said guide making an acute angle with the axis of the shaft.

3. An uncoupling device for car couplers comprising a transverse shaft mounted on the car and having one end bent to form a normally horizontal crank and the other end bent to form a handle, a transverse rod resting at an intermediate point thereof on said crank, said rod being attached at one end to the upper end of the locking pin, and a fixed sleeve loosely embracing the other end of the rod.

4. An uncoupling device for car couplers comprising a rod attached at one end to the locking pin, a sleeve surrounding the other end, the sleeve having its diagonally opposite inner edges beveled so as to permit withdrawal of the rod therefrom when the drawbar is pulled out from the car.

5. An uncoupling device for car couplers comprising a rod attached at one end to the upper end of a vertically displaceable locking pin, the other end passing through a sleeve, said sleeve being cut away so as to permit the opposite end of the rod to swing horizontally away from the car.

CHARLES A. SCHROYER.

Witnesses:
ANNIE C. COURTENAY,
EDYTHE M. ANDERSON.